J. L. HUBER.
PROCESS OF MAKING THORIUM SULFID.
APPLICATION FILED JUNE 1, 1908.
941,071.
Patented Nov. 23, 1909.
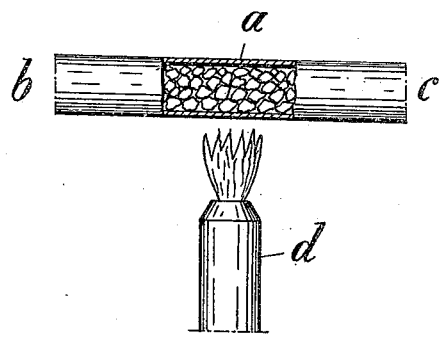
Witnesses:-
C. H. Crawford
E. Schallinger
Inventor:-
Johann Ludwig Huber
by B. Singer Attorney

UNITED STATES PATENT OFFICE.

JOHANN LUDWIG HUBER, OF NIEDERSCHÖNEWEIDE, NEAR BERLIN, GERMANY, ASSIGNOR TO THE FIRM OF KUNHEIM U. CO., OF NIEDERSCHÖNEWEIDE, NEAR BERLIN, GERMANY.

PROCESS OF MAKING THORIUM SULFID.

941,071. Specification of Letters Patent. Patented Nov. 23, 1909.

Application filed June 1, 1908. Serial No. 436,120.

*To all whom it may concern:*

Be it known that I, JOHANN LUDWIG HUBER, doctor of philosophy, chemist, a subject of the Grand Duke of Baden and the German Emperor, residing at Niederschöneweide, near Berlin, Germany, have invented new and useful Improvements in Processes of Making Thorium Sulfid, of which the following is a specification.

The sulfid of thorium is a very suitable material for producing thorium metal usable in filaments for electric incandescent lamps.

I have discovered that one can prepare easily sulfid of thorium in a very pure state, especially free from carbon by treating the dry halogen compounds of thorium, especially the chlorid of thorium, with dry sulfureted hydrogen, free from air, at a temperature below the sublimation temperature of the halogen compound of thorium, but as near to that temperature as possible. I have found that a very suitable temperature for conducting my process is at about 550° C. The sulfureted hydrogen is led over the heated halogen compound of thorium in a slow stream. I have found it as suitable to add to the halogen compound of thorium substances which are not attacked by the halogen compound of thorium nor by the sulfureted hydrogen. The purpose of such additions is to avoid a conglomeration of the halogen compound or the obtained sulfid of thorium and to moderate the reaction. I may use as additions for example: infusorial earth, asbestos, clay. When using these materials it is difficult to separate the additions from the obtained sulfid of thorium. If I desire to obtain pure sulfid of thorium I use as additions substances which may be easily separated from the sulfid of thorium. I may use chlorid of potassium or sodium. I may employ a mixture of chlorid of thorium with 5, 10, or any amount up to 50 per cent. of chlorid of potassium. The proportion of the chlorid of potassium depends on the velocity with which I wish to conduct the reaction. If I desire to finish with the reaction in a short time, I use a smaller proportion of addition than if I desire to moderate the reaction in a higher degree. The separation of the chlorid of sodium from the sulfid of thorium is effected by lixiviating the product of the reaction with water and filtering off the undissolved sulfid of thorium from the liquid.

The sulfureted hydrogen may be used in a pure state or mixed with inert gases, for example nitrogen or carbonic acid.

In the drawing a vertical section through an apparatus suitable for carrying out my process is shown.

*a* is a tube containing haloid of thorium. At *b* the sulfureted hydrogen is introduced and at *c* the gases are led away.

*d* is a suitable heating means.

Sulfureted hydrogen is conducted over the haloid of thorium until the gases leaving tube *a* will be free of hydrohaloid acid.

What I claim as my invention and desire to secure by Letters Patent, is:

1. The process of making thorium sulfid which consists in causing sulfureted hydrogen to react on heated haloid of thorium in a solid state at temperatures below the sublimation temperature of haloid of thorium.

2. The process of making thorium sulfid which consists in causing sulfureted hydrogen to react on heated haloid of thorium in a solid state mixed with substances indifferent to haloid of thorium and sulfureted hydrogen below the sublimation temperature of haloid of thorium.

3. The process of making thorium sulfid which consists in causing sulfureted hydrogen to react on heated chlorid of thorium in a solid state mixed with chlorid of sodium below the sublimation temperature of chlorid of thorium.

In testimony whereof I have signed my name to this specification in the presence of two subscribing witnesses.

JOHANN LUDWIG HUBER.

Witnesses:
 HENRY HASPER,
 WOLDEMAR HAUPT.